Nov. 27, 1962    G. M. EDELMAN    3,065,930
GUIDANCE SYSTEM

Filed Oct. 12, 1956    5 Sheets-Sheet 1

GILBERT M. EDELMAN
INVENTOR

BY
ATTORNEYS

Nov. 27, 1962 G. M. EDELMAN 3,065,930
GUIDANCE SYSTEM

Filed Oct. 12, 1956 5 Sheets-Sheet 2

INVENTOR
GILBERT M. EDELMAN

BY *[signatures]*
ATTORNEYS

Nov. 27, 1962  G. M. EDELMAN  3,065,930
GUIDANCE SYSTEM

Filed Oct. 12, 1956  5 Sheets-Sheet 3

INVENTOR
GILBERT M. EDELMAN
BY
ATTORNEYS

Nov. 27, 1962

G. M. EDELMAN 3,065,930

GUIDANCE SYSTEM

Filed Oct. 12, 1956

GILBERT M. EDELMAN
INVENTOR

BY

ATTORNEYS

Nov. 27, 1962 G. M. EDELMAN 3,065,930
GUIDANCE SYSTEM
Filed Oct. 12, 1956 5 Sheets-Sheet 5

GILBERT M. EDELMAN
INVENTOR

BY
ATTORNEYS

United States Patent Office 3,065,930
Patented Nov. 27, 1962

3,065,930
GUIDANCE SYSTEM
Gilbert M. Edelman, Long Island City, N.Y., assignor to the United States of America as represented by the Secretary of the Navy
Filed Oct. 12, 1956, Ser. No. 615,731
10 Claims. (Cl. 244—14)

The present invention relates to a means for steering a long range aerial missile during the terminal portion of the missile's flight. More specifically, this invention relates to a device whereby a missile, having been positioned within visual range of a target by other means, is enabled to distinguish works of man, such as cities, from the natural features of the surrounding terrain.

The present invention is intended for use in a guided missile having a very long range. Prior methods of guidance possessed disadvantages not easily overcome. An inertial system of guidance depending upon gyroscopes and means for programming the course of the missile is not satisfactory for terminal guidance of a missile launched from a ship for the reason that the ship's position at the time of launching is seldom known with sufficient accuracy. A celestial navigation system requires a clear window which will not deform with changes in temperature. Moreover the instrumentation of a celestial navigation system is complex and heavy. Map matching guidance systems exist which appear to provide sufficient accuracy, however, such systems require preliminary reconnaissance to be made of the target area so that radar maps can be obtained.

It is an object of the present invention to provide means for guiding a missile in the terminal stages of its flight.

It is a further object of the present invention to provide terminal guidance means not dependent upon preliminary reconnaissance.

It is an additional object of the present invention to provide a terminal guidance means which functions by distinguishing urban areas from rural areas.

Other objects and many of the attendant advantages of this invention will be readily appreciated as the same becomes better understood by reference to the following detailed description when considered in connection with the accompanying drawings.

Briefly, the system of the present invention relies primarily upon the orthogonal pattern of city streets, or the spotty appearance caused by light reflection from vertical surfaces of buildings, to produce an alternating signal having a frequency higher than that of the signal obtained from rural terrain. The lower frequency signals are rejected by means of a band pass filter, or other means, so that the missile is cognizant only of the areas possessing the aforementioned qualities, namely, spottiness or street patterns.

Figure 1:
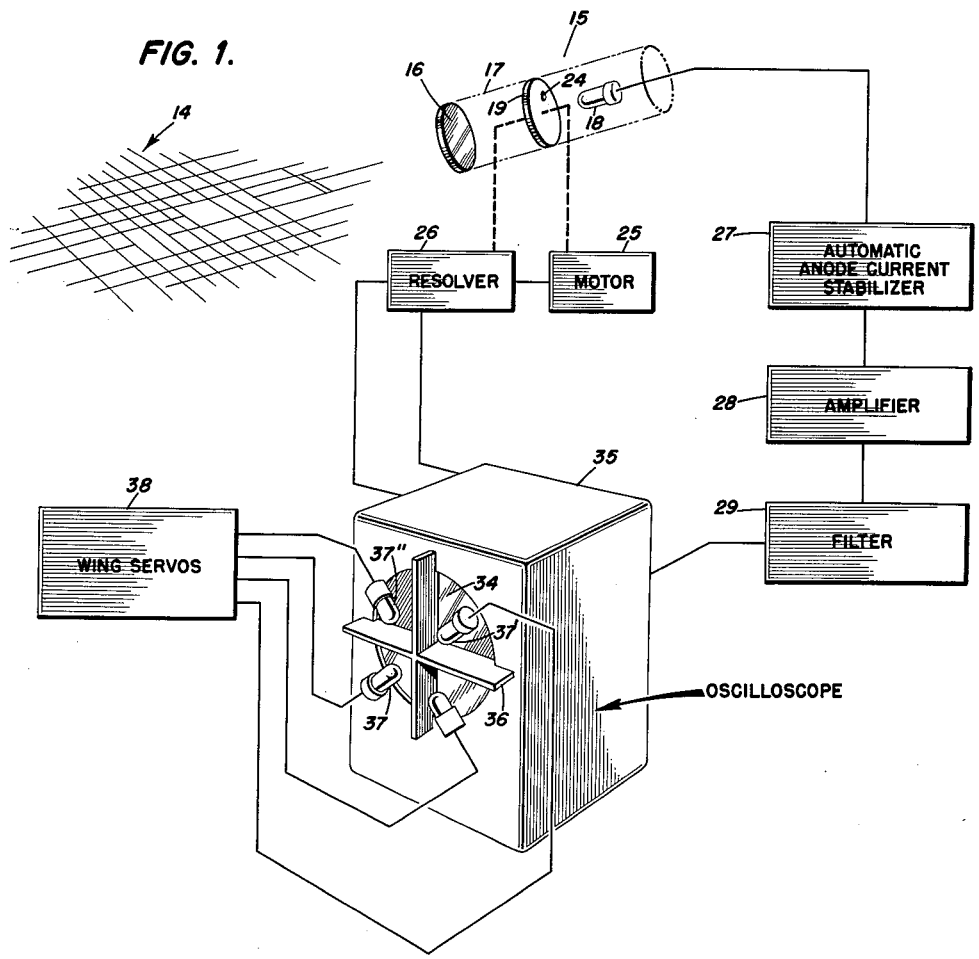
FIG. 1 is a block diagram of one embodiment of the present invention.

Referring to FIG. 1, a target city 14, having a gridlike system of streets, is shown. The remainder of the components shown and to be described hereinafter are carried by a missile, so that the missile-borne equipment will seek out the target and cause the missile to steer towards it.

A scanning device, shown generally at 15, provides a coordinate system for missile navigation. The scanner 15 includes a lens 16 mounted in a suitable aperture in the missile body, a light tube 17, a photoelectric tube 18, and a scanning disc 19. The scanning disc 19 is mounted in the focal plane of lens 16, and contains a small aperture 24 for admitting light to the photoelectric tube 18. The light tube 17 excludes all light from the photoelectric tube 18 except that passing through the aperture 24. The scanning disc 19 is continuously rotated by means of a motor 25, while the aperture 24 can be selectively positioned along a radius of the disc 19. A resolver 26 or other suitable means is geared to the motor 25 to provide reference voltages $x$ and $y$ corresponding to the location of the spot with reference to the missile boresight, the missile boresight being a system of polar coordinates established in a plane perpendicular to the longitudinal axis of the missile.

The output of the photoelectric tube 18 is supplied to an automatic anode current stabilizer 27 which compensates for variations in the output amplitude in much the same fashion as an automatic gain control commonly found in radio receiving sets. The output of the current stabilizer 27 is amplified and filtered, successively, by means of an amplifier 28 and a filter 29. The output of the filter 29 controls the intensity of the light emitted by the cathode ray tube 34 of an oscilloscope 35.

The face of cathode ray tube 34 is divided into quadrants by light barriers 36. Photoelectric tube detectors 37 are positioned each within a quadrant so as to receive light from one quadrant alone. The photoelectric tube detectors 37 supply steering signals to the wing servos 38 which cause the missile to alter its course in an appropriate manner.

Figure 2:
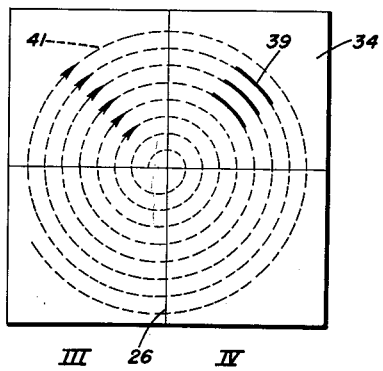
FIG. 2 illustrates the oscilloscope presentation of the apparatus of FIG. 1 in which the location of a target is indicated.

FIG. 2 illustrates the presentation of the cathode ray tube 34 indicating a target located in the upper right quadrant I at 39. Reference voltages $x$ and $y$ derived from resolver 26 are applied to the horizontal and vertical deflection plates of the cathode ray tube 34. The reference voltages indicate the instantaneous position of aperture 24 with respect to the missile boresight. Therefore, if aperture 24 commences at the center of disc 19 and proceeds outward along a radius of the disc at a uniform rate during rotation of the disc at a constant speed, the locus of the cathode ray beam will be a spiral trace as indicated by the dashed line 41.

Target recognition and missile steering are accomplished in the following manner. The signal derived by scanning rural terrain will fluctuate in amplitude as a result of the gradations in shading encountered at the borders of fields sown to different crops, and so forth. Similar fluctuations occur when a metropolitan area is scanned. It is evident, however, that due to the ordered arrangement of city streets and their proximity to each other, smaller lots, vertical building surfaces and the like, the fluctuations occurring in the metropolitan signal will have a considerably higher frequency than the rural signal. Pattern recognition is conveniently accomplished by rejecting the low frequency signals by means of filter 29 and allowing only the high frequency signals to pass. The cathode ray beam of oscilloscope 35 is blanked, leaving the cathode ray tube dark until the output of filter 29 is of sufficient magnitude to overcome the blanking voltage. As has previously been discussed, such an output would only occur when a city is within the field of view of the scanning device 15.

Figure 3:
FIG. 3 is a facsimile of an aerial photograph of a town and adjoining rural areas.
Figure 4:
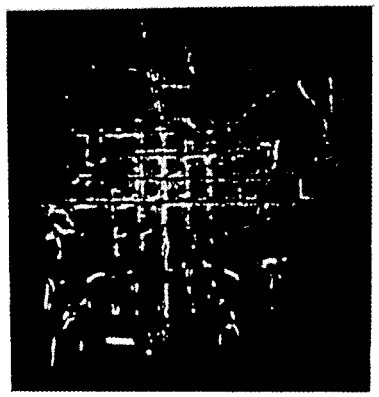
FIG. 4 illustrates the cathode ray tube display of the area of FIG. 3 provided by the present invention.
Figure 5:
FIG. 5 illustrates the cathode ray tube display of the area of FIG. 3 in which the most intense signals are selected for display.

In FIGS. 3, 4, and 5, the detection of a target by means of pattern recognition is illustrated. FIG. 3 is a facsimile of an aerial photograph of a small town in which the city streets and the spotty appearance of the urban area are clearly visible. The selection of the higher frequency fluctuations in the signal output of the photoelectric tube 18 provides a cathode ray tube display as shown in FIG. 4. It will be seen that field outlines are obscured so that only the metropolitan portion of FIG. 3 appears in FIG. 4 as an indication of the presence of a target.

In FIG. 5, amplitude selection has been performed, i.e. the blanking voltage has been increased, so that the luminous area represents that portion of the city providing the most intense return. A more precise steering signal is thereby provided.

Again referring to FIG. 2, the area 39 of light indicates the location of a city to the right and beyond the missile. Since each of the quadrants I, II, III and IV is viewed by a separate photoelectric tubes 37, the missile has available sufficient information to home on the target. For instance, for a target location as indicated in FIG. 2, the output of the photoelectric tube 37' associated with quadrant I would cause the missile to steer right. As the missile turns toward the right, the light area 39 moves left causing the output of the photoelectric tube 37" for quadrant II to neutralize part of the output of the photoelectric tube for quadrant I. When the light area 39 is divided equally between quadrants I and II, the missile will steer neither right nor left, but will hold its course in azimuth. The combination of the two outputs can be used to cause the missile either to increase in altitude until an equal output is obtained from all four photoelectric tubes or to hold its then altitude until such time as an output is obtained from the photoelectric tubes corresponding to quadrants III and IV, at which time appropriate changes in altitude are undertaken.

The invention as embodiment in FIG. 1 is the simplest and most direct type for illustrating the operation of the invention. In the preceding embodiment, pattern characteristics of the received signal are recognized by the frequency of the signal. In a broader sense, frequency includes not only the regular rate of occurrence of an event in time but also the regular rate of occurrence in space. Thus, for example, if one were to consider the frequency in which dark areas are encountered upon a light surface of given area and to choose as the first illustration a plain sheet of white paper, the frequency would be zero. If now dark areas are regularly spaced upon the white sheet, the frequency might be said to be 1 per inch, and so forth, depending upon the spacing. The most convenient method of determining spatial frequency involves the determination of the total number of variations within a specific area thereby indirectly providing an indication of spatial frequency.

The previously discussed distinguishing characteristics of an urban area lead to the obvious conclusion that those areas possess a higher spatial frequency of variegated return than do rural areas. Therefore a different method of pattern recognition may be adopted which does not rely upon periodic scanning for pattern recognition but which employs a technique for determining spatial, as distinguished from temporal, frequency.

Figure 6:
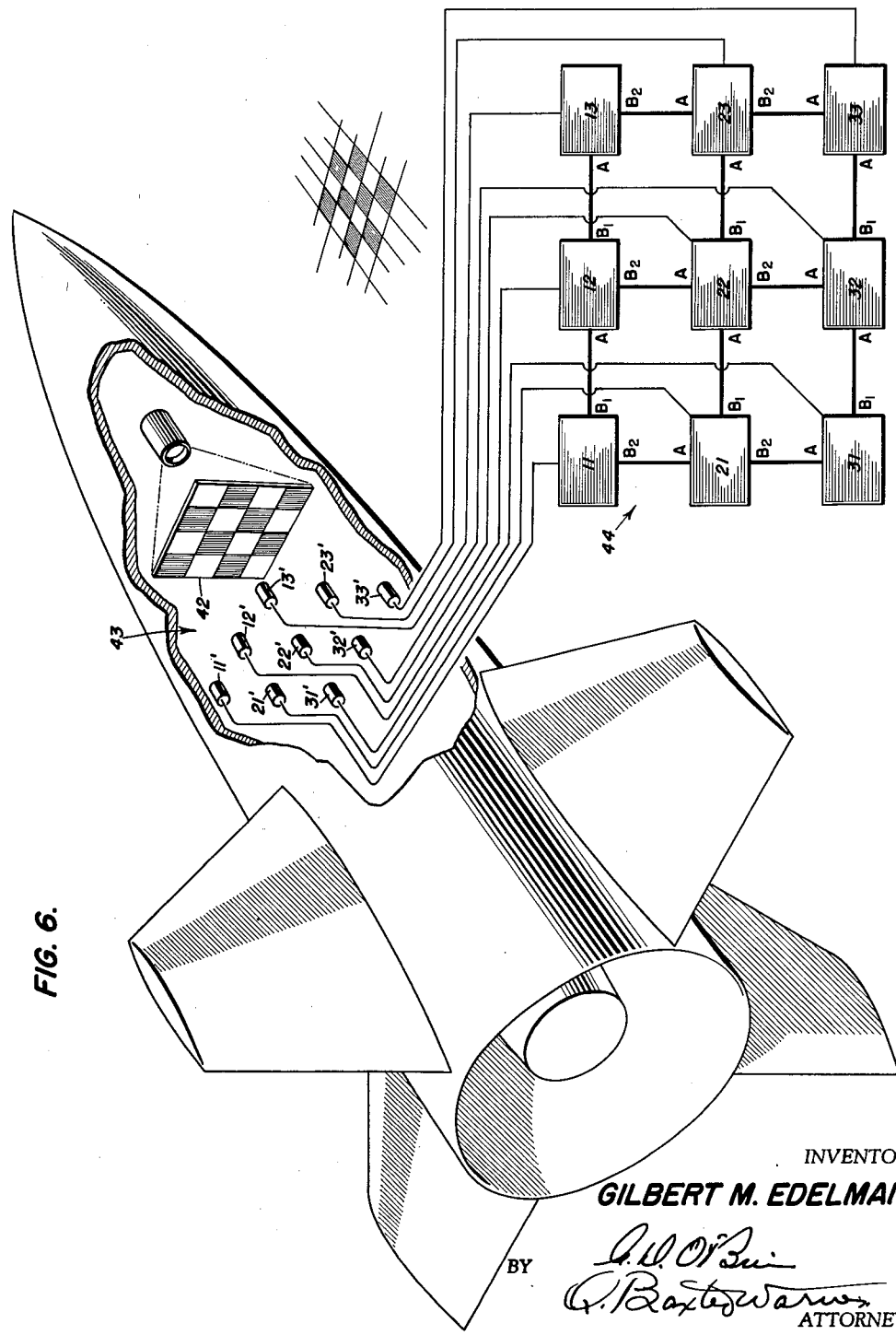
FIG. 6 is a block diagram of a second embodiment of the invention.

FIG. 6 illustrates the fundamental portion of the airborne pattern recognition apparatus operating upon the principle of determining spatial frequency. An image 42 of the variegated terrain, which for simplicity is assumed to be a checkerboard pattern of alternately light and dark areas, is projected into the missile. A phototube mosaic 43 faces the image and receives light travelling in straight rays from a portion of the image. That is, the phototubes of the mosaic 43 are arranged to receive light along substantially straight line paths from the image, scattered or reflected light being eliminated by light shields (not shown). The phototube outputs are amplified in a matrix circuit 44 in which the phototube outputs are interrelated to provide a maximum output for a condition in which the phototubes are alternatively illuminated and dark, and a minimum output for a condition in which the entire mosaic is either uniformly illuminated or dark.

As will later be clear, the mosaic, while preferably square, is not necessarily so, nor must the mosaic be composed of any specific number of phototubes.

Figure 7:
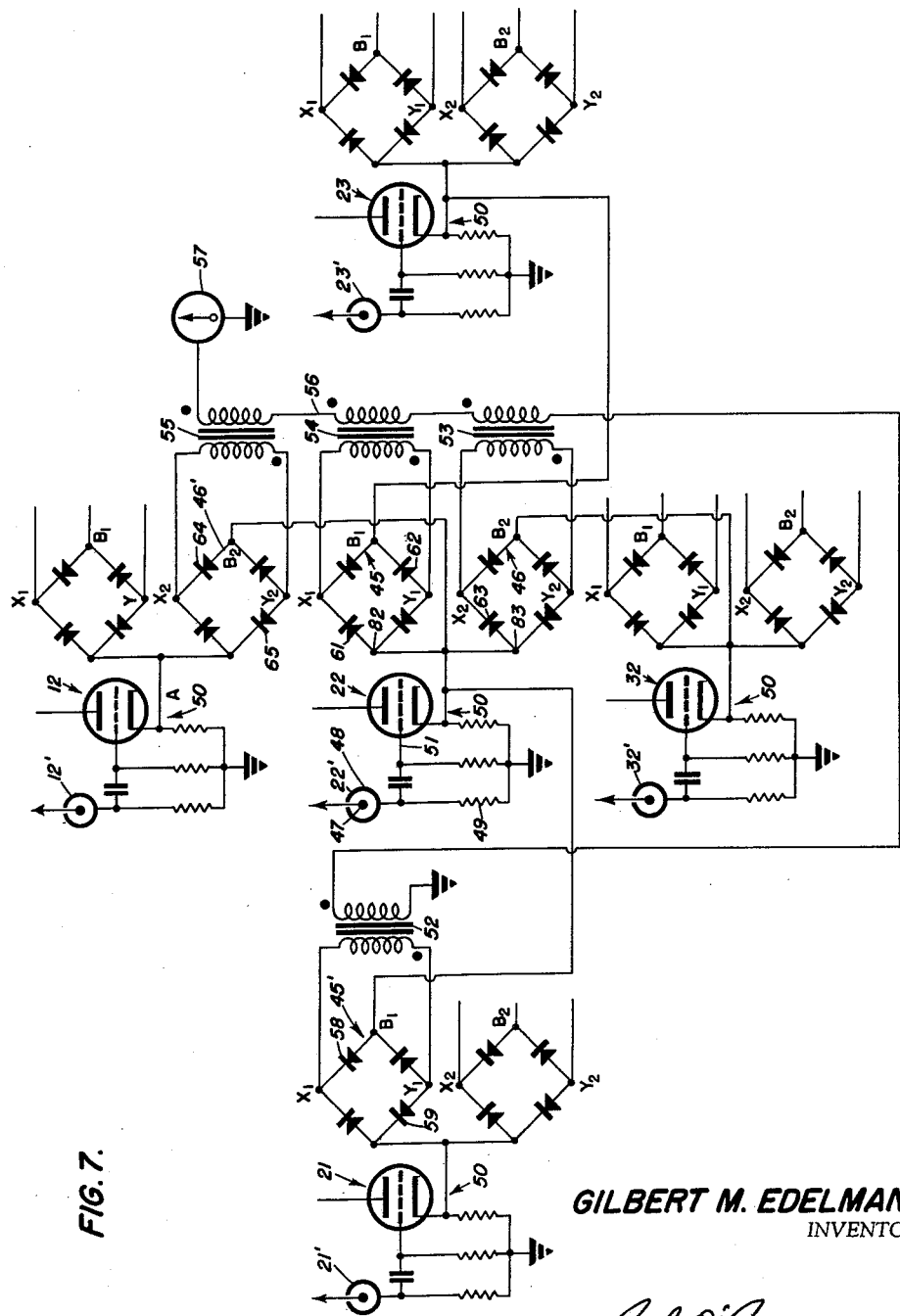
FIG. 7 is a schematic diagram of a portion of the apparatus illustrated in FIG. 6.

In FIG. 7 a portion of the mosaic circuit 44 is shown in greater detail. The mosaic circuit 44 includes an amplifying element 11, 12, etc. associated with each of the phototubes 11', 12', etc. in the matrix 43. The amplifying elements 11, 12, etc. are substantially identical cathode followers 50 which include in their outputs a pair of diode bridges 45 and 46.

The bridges 45 and 46 each comprise four diodes connected in a fashion similar to a full wave rectifier. The function of the bridges however, is not to rectify in the usual manner but to permit the interconnection of amplifying elements adjoining one another in the matrix circuit so that the output of a particular amplifying element will depend upon the condition of its surrounding elements.

Alternating voltage from a common source is applied to the anodes 47 of each of the phototubes 11', 12', etc. in the matrix 43. The cathodes 48 of the phototubes are each grounded through resistors 49. The voltages developed across the resistors 49 are applied to the grids 51 of the various amplifying elements 22, 23, etc.

The output of cathode follower 50 in element 22 is applied to junctions 82 and 83 of output bridges 45 and 46. The output of the cathode follower in element 23, laterally adjacent element 22, is applied to junction $B_1$ directly opposite junction 52 in bridge 45. The output of the cathode follower in element 32 subjacent element 22 is connected to junction $B_2$ of bridge 46.

The entire matrix circuit 44 is built up in this manner, the cathode follower in element 22 being connected to the $B_1$ junction of bridge 45' of the laterally preceding element 21 and to junction $B_2$ of bridge 46' in the output of the immediately superior element 12.

The A, $B_1$ and $B_2$ connections are shown for the nine element matrix in FIG. 6. If it is desired to employ a larger matrix, the additional elements are added in the same manner.

Again referring to FIG. 7, junctions $x_1$ and $y_1$ of each of the bridges are connected to the primary windings of transformers 52, 53, 54 and 55. The secondary windings of transformers 52, 53, 54 and 55 are connected additively in a series circuit 56 which is closed through a detector 57. The detector indicates the current flowing in circuit 56 and may simply comprise an ammeter as shown.

Considering only the portion of the mosaic illustrated in FIG. 7, the operation of the mosaic circuit will be discussed under the conditions of uniform illumination and illumination of alternate phototubes.

If no light falls upon the phototubes 11', 12', etc. of the mosaic 43, scarcely any A.C. variation will appear at the cathodes of the amplifying elements 11, 12, etc., since the impedance of the dark phototubes is many times that of the resistors 49. Moreover the quiescent potential at the cathodes of the amplifying elements is very nearly equal so that there will be little tendency for an interchange of currents between amplifying elements interconnected through junctions A, $B_1$ and $B_2$. Also, if the phototubes are uniformly illuminated the potentials at the cathodes of the amplifying elements, while possessing a large A.C. component, still will be substantially equal and there will be little tendency for currents to flow therebetween.

If, however, the cells are alternately illuminated the potentials at the cathodes of alternate cathode followers will be alternately high and low thus establishing a condition for maximum current flow. For example, if the central tube 22' is illuminated, and the surrounding tubes 12', 23, 32' and 21' are dark, current will flow from element 22 to the surrounding elements via the following paths: Through the $B_1$ junction and diode 58 of bridge 45' to the $x_1$ connection of transformer 52 and through the $y_1$ junction and diode 59 to the cathode of element 21; Through diode 61 of bridge 45 to the $x_1$ connection of transformer 54 and from the $y_1$ connection of transformer 54 through diode 62 and the $B_1$ junction to the cathode of element 23; Through diode 63 to the $x_2$ connection of transformer 53 and to the cathode of element 32 through the $y_2$ and $B_2$ junctions of bridge 46; Through junction $B_2$ and diode 64 of bridge 46' to the $x_2$ connection of transformer 55 and from connection $y_2$ of transformer 55 through diode 65 to the cathode of element 12.

Thus for tube 22' illuminated and the surrounding cells dark, current will flow in the secondaries of each of the four transformers 49, 51, 52 and 53 to create a maximum voltage drop in resistor 57. If cell 23' is then illuminated current will no longer flow towards the cathode of element 23 and the current in the secondary of transformer 54 will cease thereby decreasing the voltage drop across resistor 57. Similarly, if any of the other surrounding elements are illuminated, the voltage developed across resistor 57 will decrease.

The mosaic thus provides a means for determining the number of light variations within a specific area. The mosaic may be utilized in combination with a scanning and tracking mechanism to provide steering signals.

The scanning and tracking mechanism is generally similar to devices employed in automatic map matching navigational devices and it should be understood that no claim is directed solely toward the mechanism.

Figure 8:
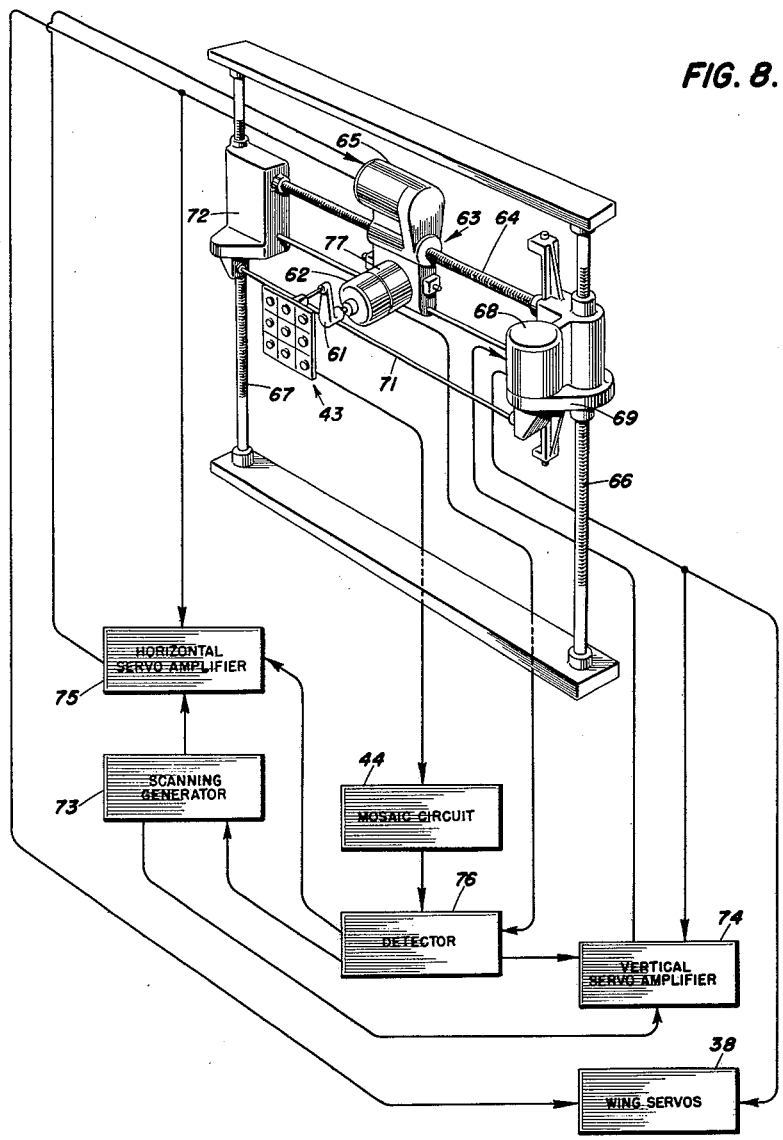
FIG. 8 is a schematic block diagram showing a scanning and tracking mechanism for use with the embodiment of FIG. 6.

FIG. 8 illustrates a mechanism for employing the mosaic 43 to guide an aerial vehicle toward an urban target. The mosaic faces the terrestrial image, as previously illustrated in FIG. 6, but for purposes of clarity the image is not shown. The entire image is scanned in search of a portion thereof possessing a pattern of high spatial frequency. Upon the location of such an area, scanning operations are interrupted and tracking operations commerce. When tracking, the position of the mosiac relative to the center of the image represents the error in the course of the vehicle. The error is transmitted to the vehicle steering servos as an electrical signal from potentiometers coupled to the mosiac mounting mechanism.

The mosaic 43 is pendulously suspended from a crank 61 driven by a constant speed motor 62. An orbital motion is thus imparted to the mosaic 43 which enables the tracking of a target located in the course of scanning the terrestrial image.

The mosaic 43 and its orbital drive motor 62 are secured to a carriage 63 which is carried horizontally along a lead screw 64 by a servomotor 65 driving a travelling nut. The carriage 63 and lead screw 64 are moved vertically along parallel vertical lead screws 66 and 67 by a servomotor 68 driving a travelling nut in mounting housing 69. A shaft 71 driven by servomotor 68 through bevel gears drives a travelling nut contained within housing 72 along the second vertical lead screw 67.

The motion of the mosaic is controlled during scanning operations by a scanning generator 73 which applies a voltage linearly increasing with time to the vertical servo amplifier 74 and a voltage having a triangular waveform to the horizontal servo amplifier 75.

The output of mosaic circuit 44 is resolved into vertical and horizontal components by a method similar to that employed in automatic tracking radars. The position of the mosaic during its orbital motion is fed into a phase sensitive detector 76 in terms of sine and cosine reference voltages derived from a generator 77 coupled to motor 62. Phase detection of the mosaic output with respect to the reference voltages determines the quadrant in which a target lies and consequently the direction required to correct an error.

Upon detection of a target, a signal from detector 76 causes scanning generator 73 to hold its voltage thereby arresting the scanning motion of mosaic 43. The vertical and horizontal components are then added, in servo amplifiers 74 and 75, to the constant voltage outputs of generator 73 to provide a tracking adjustment of mosaic 43. The horizontal and vertical position feedback voltages of servo motors 65 and 68 then provide steering signals for the wing servos 38.

Pattern recognition guidance systems are advantageous in that, as heretofore stated, no preliminary reconnaissance is required. They are beneficial only as a means for terminal guidance, however, since unless the target is within visual range, no steering signal is supplied. There exists, however, a magnetic system of guidance providing accuracies of within ±10 miles of a desired position for extended ranges. Magnetic guidance employed in combination with the present invention provides a complete long range missile guidance system.

The invention may be occasionally limited in that satisfactory visibility conditions must exist over the target area if the system is restricted to operation with visible illumination. It is perfectly feasible, however, to employ pattern recognition apparatus in connection with radar presentations of the terrain, in which case the visibility limitation is overcome.

Obviously many modifications and variations of the present invention are possible in the light of the above teachings. It is therefore to be understood that within the scope of the appended claims the invention may be practiced otherwise than as specifically described.

What is claimed is:

1. Apparatus for guiding an aerial vehicle, comprising means on said vehicle for presenting an image of the terrain beneath said vehicle, scanning means on said vehicle for examining portions of said image with respect to a local coordinate system established relative to said vehicle, pattern recognition means for determining the frequency characteristics of the portion of the image examined by said scanning means, and means relating the output of said pattern recognition means to the local coordinates of the vehicle to provide signals for steering said vehicle.

2. Apparatus as claimed in claim 1 wherein said pattern recognition means comprises, in combination, a detector providing an electrical signal having a temporal frequency related to the spatial frequency of the terrestrial objects from which said image is formed; and a high pass filter for rejecting those signals having low temporal frequencies.

3. Apparatus as claimed in claim 1 wherein said pattern recognition means comprises, in combination, a plurality of photoelectric detectors each of which receive illumination from separate portions of said image, and means interrelating the outputs of said detectors to provide a signal having an amplitude dependent upon the spatial frequency of the terrestrial objects from which said image is formed.

4. Apparatus for guiding an aerial vehicle comprising means on said vehicle for receiving radiation emanating from the terrain beneath said vehicle, scanning means on said vehicle for examining said received radiation bit by bit with respect to references local to said vehicle, means including a photoelectric detector for detecting the radiation examined by said scanning means to provide an electrical signal having an amplitude proportional to the intensity of said received radiation, means for suppressing the low frequency components of said signal, means receiving the non-suppressed components of said signal for forming a partial terrestrial image related to said scanning references, and means including a plurality of photoelectric detectors for steering said vehicle to maintain said image centered with respect to said references.

5. Apparatus for guiding an aerial vehicle comprising, means on said vehicle for receiving radiation emanating from objects contained within a relatively large area of the terrain beneath said vehicle, scanning means on said vehicle for examining said received radiation bit by bit with respect to references local to said vehicle, a plurality of detectors carried by said scanning means for simultaneously detecting radiation received from separate bits of said relatively large area of terrain, said detectors each providing an output signal depending upon the intensity of the radiation impinging thereupon, means interrelating said detector output signals to provide a combined output signal having an amplitude dependent upon the spatial frequency of said terrestrial objects, and means relating said combined output signal to the coordinates of said scanning means to provide steering signals for said vehicle.

6. Apparatus for guiding an aerial vehicle, comprising means aboard said vehicle for focusing into an image radiation received from the terrain beneath said vehicle, means for scanning said image to divide the same into elemental parts, a photoelectric cell for converting the elements of said image passed by said scanning means into electrical impulses, a filter for rejecting the lower frequency outputs of said photoelectric cell and for passing the higher frequency outputs thereof, means for forming a second image from the higher frequency outputs, and means actuated by said said second image for steering said vehicle toward the center of the terrestrial objects represented by said image.

7. Apparatus as claimed in claim 6 wherein said means for forming a second image comprises a cathode ray tube having sweep circuits synchronized with said scanning means and having the intensity of the light emitted thereby controlled by the outputs passed by said filter.

8. Apparatus as claimed in claim 7 wherein said means for steering said vehicle comprises, a plurality of photocells each arranged to receive light emitted from separate portions of said cathode ray tube, and servomechanisms for positioning control surfaces on said vehicle to control the motion thereof in pitch and yaw, said plurality of photocells supplying input control signals for said servomechanisms.

9. Apparatus for guiding an aerial vehicle, comprising a scanner on the vehicle, said scanner including a lens, a disc having an aperture, means for rotating the disc, and a photoelectric cell for detecting radiation transmitted by said aperture, means for compensating for changes in the average magnitude of the output of said photoelectric detector, an amplifier for increasing the amplitude of said compensated output, a filter for rejecting low frequency components of said compensated output thereby separating outputs characteristic of rural areas from outputs characteristic of urban areas, and means for converting the output of said filter into steering signals to control the course of said vehicle.

10. In a guidance system for steering an aerial vehicle toward an urban target, apparatus for distinguishing urban terrestrial areas from rural terrestrial areas, comprising, a plurality of photoelectric detectors arranged to lie in a plane, each of said detectors receiving illumination from separate portions of the terrain beneath the vehicle, a plurality of amplifiers arranged in matrix form for amplifying the individual outputs of said detectors, a rectifying bridge in the output of each of said amplifiers, a bias connection joining the output of each amplifier to a point within the bridges of adjacent amplifiers, and means connected to each of said bridges for measuring the total current flowing between said bridges.

References Cited in the file of this patent
UNITED STATES PATENTS

| | | |
|---|---|---|
| 2,541,277 | Omber | Feb. 13, 1951 |
| 2,679,636 | Hillyer | May 25, 1954 |